United States Patent [19]
Shen et al.

[11] Patent Number: 5,363,437
[45] Date of Patent: Nov. 8, 1994

[54] TELEPHONE DIALING DEVICE AND THE OPERATING METHOD THEREOF

[75] Inventors: Hung-Ting Shen; Rin-Min Huang, both of Hsinchu, Taiwan, Prov. of China

[73] Assignee: Winbond Electronic Corp., Hsinchu, Taiwan, Prov. of China

[21] Appl. No.: 930,354

[22] Filed: Aug. 17, 1992

[51] Int. Cl.[5] .............................................. H04M 1/00
[52] U.S. Cl. ................................... 379/355; 379/354; 379/356; 379/359; 379/352
[58] Field of Search ............... 379/355, 354, 356, 359, 379/352

[56] References Cited

U.S. PATENT DOCUMENTS

| | | | |
|---|---|---|---|
| 4,860,349 | 8/1989 | Brown | 379/355 |
| 4,873,720 | 10/1989 | Son | 379/356 |
| 4,882,750 | 11/1989 | Henderson et al. | 379/355 |
| 5,151,933 | 9/1992 | Abe | 379/355 |
| 5,216,709 | 6/1993 | Wen et al. | 379/355 |
| 5,239,576 | 8/1993 | Yoshida et al. | 379/354 |

*Primary Examiner*—James L. Dwyer
*Assistant Examiner*—J. M. Saint-Surin
*Attorney, Agent, or Firm*—Harness, Dickey & Pierce

[57] ABSTRACT

A telephone dialing device includes a data memory unit with a first memory region for storing normal dial numbers and a second memory region containing pre-stored memory dial numbers. A keypad is operated so as to provide a sequence of key inputs. The key inputs are decoded sequentially to determine if a normal or memory dialing activity is to be accomplished. A normal dial number corresponding to the decoded input is stored in the first memory region of the data memory unit, and a first code, which includes a normal dialing command and a first address to indicate the location of the normal dial number corresponding to the decoded input in the first memory region, is generated if the decoded input involves a normal dialing activity. A second code, which includes a memory dialing command and a second address to indicate the location of the memory dial number corresponding to the decoded input in the second memory region, is generated if the decoded input involves a memory dialing activity. The first and second codes are stored in a program memory unit in a sequence similar to that of the key inputs from the keypad, and are retrieved sequentially therefrom, thereby permitting retrieval of the corresponding dial number and execution of the dialing activity corresponding to the retrieved first and second codes.

4 Claims, 2 Drawing Sheets

FIG. 2A

| ADDRESS | COMMAND CODE | ADDRESS CODE |
|---|---|---|
| 000 | 00 | 000 |
| 001 | 01 | 110 |
| 010 | 00 | 001 |
| 011 | 01 | 100 |
| 100 | 11 | 111 |
| 101 | 01 | 010 |
| 110 | | |
| 111 | | |

| ADDRESS | |
|---|---|
| 000 | ND1 |
| 001 | ND2 |
| 010 | MD3 |
| 011 | |
| 100 | MD2 |
| 101 | |
| 110 | MD1 |

30

TELEPHONE DIALING DEVICE AND THE OPERATING METHOD THEREOF

BACKGROUND OF THE INVENTION

1. Field of the Invention

The invention relates to a telephone dialing device, more particularly to a telephone dialing device which permits rapid operation of a telephone keypad when executing a dialing operation.

2. Description of the Related Art

There are three different dialing activities which are presently employed when dialing a telephone number: normal dialing (ND), memory dialing (MD) and re-dialing (RD).

Present telephone dialing devices are capable of accomplishing all three of the above-mentioned dialing activities. Since a telephone number consists of a plurality of dial numbers, the telephone dialing device must be capable of accepting an unlimited number of key inputs from a telephone keypad and must be capable of dialing the dial numbers which correspond to the key inputs.

A main drawback of conventional telephone dialing devices is that dialing of an immediately preceding dial number must be completed before the telephone dialing device can accept and process a succeeding key input from the telephone keypad. Therefore, rapid operation of the telephone keypad is not possible.

SUMMARY OF THE INVENTION

The objective of the present invention is to provide a telephone dialing device which permits rapid operation of a telephone keypad when executing a dialing operation.

Accordingly, the preferred embodiment of a telephone dialing device of the present invention comprises:
- a data memory unit which includes a first memory region for storing normal dial numbers and a second memory region containing pre-stored memory dial numbers;
- a keypad which is operable so as to provide a sequence of key inputs;
- means for decoding the key inputs sequentially to determine if a decoded one of the key inputs involves a normal dialing activity, a memory dialing activity or a re-dialing activity;
- a first programmed means for storing a normal dial number corresponding to the decoded one of the key inputs in the first memory region of the data memory unit if the decoded one of the key inputs involves a normal dialing activity;
- a second programmed means for generating a first code which includes a normal dialing command code and a first address code to indicate the location of the normal dial number corresponding to the decoded one of the key inputs in the first memory region of the data memory unit if the decoded one of the key inputs involves a normal dialing activity, said second programmed means generating a second code which includes a memory dialing command code and a second address code to indicate the location of the memory dial number corresponding to the decoded one of the key inputs in the second memory region of the data memory unit if the decoded one of the key inputs involves a memory dialing activity, said second programmed means generating a third code which includes a re-dialing command code if the decoded one of the key inputs involves a re-dialing activity;
- a program memory means for storing the first, second and third codes therein in a sequence similar to that of the key inputs from the keypad;
- a third programmed means for retrieving the first, second and third codes sequentially from the program memory means; and
- a fourth programmed means for retrieving the corresponding dial number from the data memory unit and for executing the dialing activity corresponding to the retrieved code if the retrieved code is one of the first and second codes, said fourth programmed means sequentially retrieving the corresponding dial numbers from the data memory unit and sequentially executing the dialing activities corresponding to the first and second codes which preceded the third code in the program memory means if the retrieved code is the third code.

BRIEF DESCRIPTION OF THE DRAWINGS

Other features and advantages of the present invention will become apparent in the following detailed description of the preferred embodiment, with reference to the accompanying drawings, of which:

FIG. 2A is an illustrative example of the contents of a program memory unit of the preferred embodiment; and FIG. 2B is an illustrative example of the contents of a data memory unit of the preferred embodiment.

DETAILED DESCRIPTION OF THE PREFERRED EMBODIMENT

Figure 1:
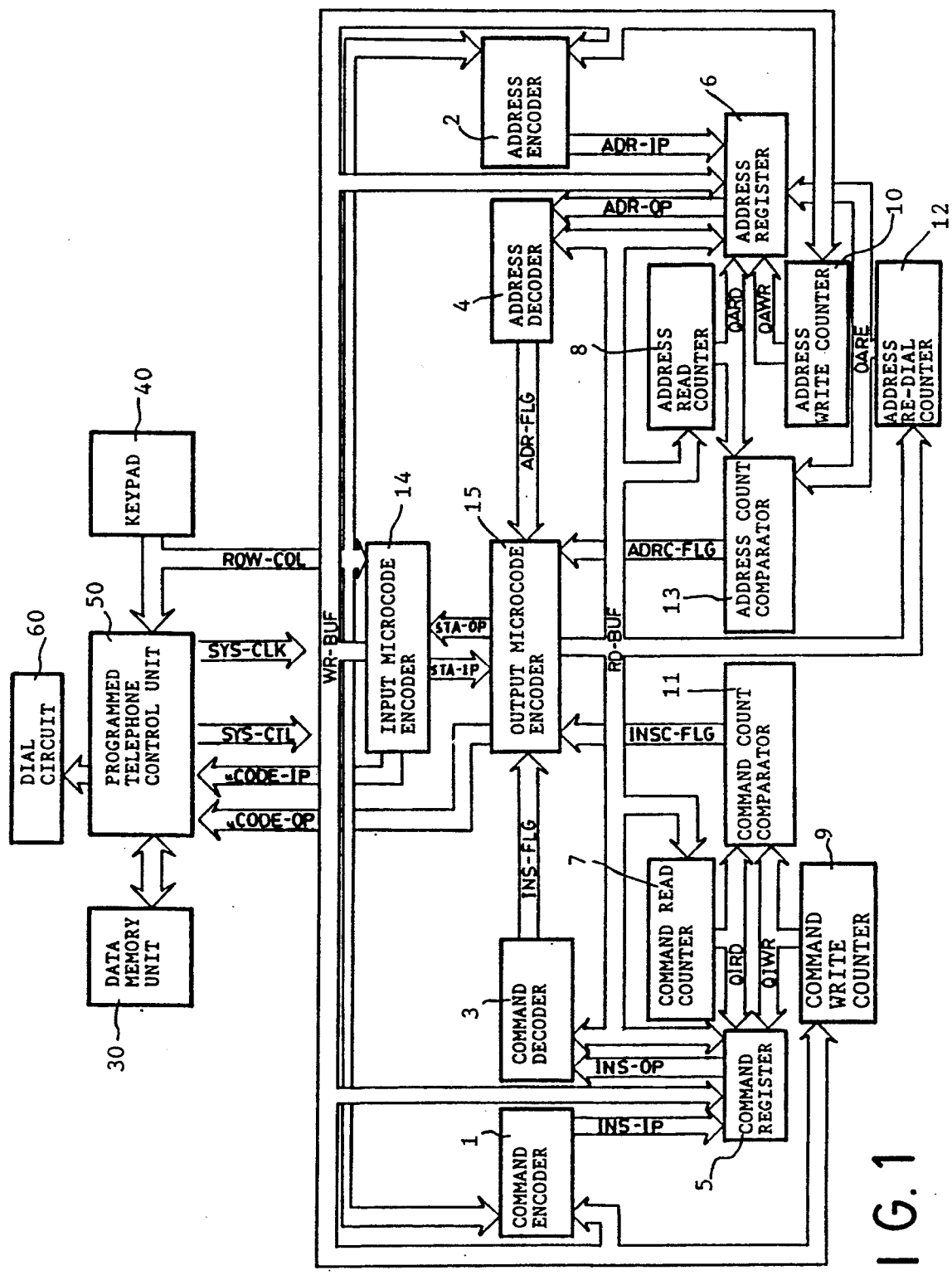
FIG. 1 is a schematic electrical circuit diagram of the preferred embodiment of a telephone dialing device according to the present invention.

Referring to FIG. 1, the preferred embodiment of a telephone dialing device according to the present invention is shown to comprise a command encoder (1), an address encoder (2), a command decoder (3), an address decoder (4), a command register (5), an address register (6), a command read counter (7), an address read counter (8), a command write counter (9), an address write counter (10), a command count comparator (11), an address re-dial counter (12), an address count comparator (13), an input microcode encoder (14), an output microcode encoder (15), a data memory unit (30), a telephone keypad (40), a programmed telephone control unit (50) and a dial circuit (60).

The command encoder (1) receives control signals from the telephone control unit (50) via the WR-BUF signal path and key inputs from the telephone keypad (40) via the ROW-COL signal path. Upon reception of a control signal, the command encoder (1) checks for a pressed key condition and then generates a command code which corresponds to the pressed key. The address encoder (2) similarly receives control signals from the WR-BUF signal path and the key inputs from the ROW-COL signal path. Upon reception of a control signal, the address encoder (2) generates an address code which corresponds to the pressed key. The command decoder (3) receives control signals from the RD-BUF signal path and command codes from the INS-OP signal path. Upon reception of a control signal, the command decoder (3) decodes the received command code into an instruction signal and sends the instruction signal to the output microcode encoder (15)

via the INS-FLG signal path, thus informing the output microcode encoder (15) as to what type of dialing activity should be executed. The address decoder (4) receives control signals from the RD-BUF signal path and address codes from the ADR-OP signal path. Upon reception of a control signal, the address decoder (4) decodes the received address code into an instruction signal and sends the instruction signal to the output microcode encoder (15) via the ADR-FLG signal path.

The command register (5) receives command codes from the command encoder (1) via the INS-IP signal path and stores the same therein. The stored command code is then sent to the command decoder (3) via the INS-OP signal path. The address register (6) receives address codes from the address encoder (2) via the ADR-IP signal path and stores the same therein. The stored address code is then sent to the address decoder (4) via the ADR-OP signal path. The output of the command read counter (7) is sent to the QIRD signal path and indicates to the command register (5) the location of the next command code to be read. After the next command code has been read, the output of the command read counter (7) is incremented by one unit. The control signals for incrementing the output of the command read counter (7) are received by the command read counter (7) via the RD-BUF signal path. The output of the address read counter (8) is sent to the QARD signal path and indicates to the address register (6) the location of the next address code to be read. After the next address code has been read, the output of the address read counter (8) is incremented by one unit. The control signals for incrementing the output of the address read counter (8) are received by the address read counter (8) via the RD-BUF signal path. The output of the command write counter (9) is sent to the QIWR signal path and indicates to the command register (5) the location where the next command code is to be stored. After the next command code has been stored, the output of the command write counter (9) is incremented by one unit. The control signals for incrementing the output of the command write counter (9) are received by the command write counter (9) via the WR-BUF signal path. The output of the address write counter (10) is sent to the QAWR signal path and indicates to the address register (6) the location where the next address code is to be stored. After the next address code has been stored, the output of the address read counter (10) is incremented by one unit. The control signals for incrementing the output of the address write counter (10) are received by the address write counter (10) via the WR-BUF signal path.

The command count comparator (11) compares the outputs of the command read counter (7) and the command write counter (9). The comparison results are sent to the output microcode encoder (15) via the INSC-FLG signal path. The outputs of the command read counter (7) and the command write counter (9) are equal when all of the previously stored command codes have been accomplished, indicating that dialing has been completed. If the outputs of the command read counter (7) and the command write counter (9) are unequal, this means that there are still some command codes which have not yet been executed. The telephone control unit (50) will therefore continue the dialing operation.

The output of the address re-dial counter (12) is sent to the QARE signal path and indicates to the address register (6) the location of the next re-dial address code to be read. After the next re-dial address code has been read, the output of the address re-dial counter (12) is incremented by one unit. The control signals for incrementing the output of the address re-dial counter (12) are received by the address re-dial counter (12) via the RD-BUF signal path.

The address count comparator (13) compares the outputs of the address read counter (8) and the address re-dial counter (12). The comparison results are sent to the output microcode encoder (15) via the ADRC-FLG signal path. The outputs of the address read counter (8) and the address re-dial counter (12) are equal when dialing of all of the dial numbers to be re-dialed have been accomplished. If the outputs of the address read counter (8) and the address re-dial counter (12) are unequal, this means that there are still some dial, numbers which have yet to be re-dialed. The telephone control unit (50) will therefore continue to execute the re-dialing operation.

The input microcode encoder (14) is basically a status converter. After detecting the presence of a pressed key condition from the ROW-COL signal path, the input microcode encoder (14) generates different control signals so as to enable the telephone control unit (50) to accomplish the required operations. The control signals from the input microcode encoder (14) may be classified into two groups. The first category deals exclusively with the operations which are associated with the actual dialing operation. Control signals belonging to this category are sent out via the WR-BUF signal path and are not directly used to control the telephone control unit (50) so as to operate the dial circuit (60). The configuration of the telephone control unit (50) and the dial circuit (60) are substantially similar to those employed in conventional telephone dialing devices and will not be detailed herein. The control signals belonging to the first category are used instead in encoding keypad movement into command codes and address codes and for storing the command codes and address codes.

The second category involves control signals for operations which are not related to the actual dialing operation. These control signals are sent out via the μCODE-IP signal path for direct reception by the telephone control unit (50). The status of the input microcode encoder (14) is sent out by the same via the STA-IP signal path.

Finally, the output microcode encoder (15) is similarly a status converter. The output microcode encoder (15) receives data from the INS-FLG, the INSC-FLG, the ADR-FLG and the ADRC-FLG signal paths. The output microcode encoder (15) also receives the status of the input microcode encoder (14) from the STA-IP signal path and system control signals via the SYS-CTL signal path. The output microcode encoder (15) generates different control signals so as to enable the telephone control unit (50) to operate the dial circuit (60) so as to execute an actual dialing operation. These control signals are sent out via the μCODE-OP signal path for direct reception by the telephone control unit (50).

The command code associated with each key input from the keypad (40) is stored in the command register (5), while the address code of the corresponding key input is stored in the address register (6). The command register (5) and the address register (6) cooperatively define a program memory unit (20) (Refer to FIG. 2A). The data memory unit (30) has a first memory region for storing normal dial numbers and a second memory region containing pre-stored memory dial numbers (Refer to FIG. 2B). The relationships between the dialing activity and the command and address codes are as follows:

| DIALING ACTIVITY | |
|---|---|
| | COMMAND CODE |
| Normal dialing (ND) | 00 |
| Memory dialing (MD) | 01 |
| Re-dialing (RD) | 11 |
| | ADDRESS CODE |
| ND | 000 |
| ND | 001 |
| MD | 010 |
| MD | 011 |
| MD | 100 |
| MD | 101 |
| MD | 110 |
| MD | 111 |

FIGS. 2A and 2B are illustrative examples of the contents of the program memory unit (20) and the data memory unit (30), assuming that the dialing sequence to be executed is as follows: ND1+MD1+ND2+MD2+RD1+MD3.

The first key input (ND1) involves a normal dialing activity and the dial number corresponding to the same is stored by the telephone control unit (50) in the address 000 of the data memory unit (30). The second key input (MD1) involves a memory dialing activity and the dial number corresponding to the same was previously stored in the address 110 of the data memory unit (30). The third key input (ND2) involves a normal dialing activity and the dial number corresponding to the same is stored by the telephone control unit (50) in the address 001 of the data memory unit (30). The fourth key input (MD2) involves a memory dialing activity and the dial number corresponding to the same was previously stored in the address 100 of the data memory unit (30). The fifth key input (RD1) involves a re-dialing activity. Finally, the sixth key input (MD3) involves a memory dialing activity and the dial number corresponding to the same was previously stored in the address 010 of the data memory unit (30).

The definition of a re-dial number, as employed in the present invention, is different from that used in conventional telephone dialing systems. In a conventional telephone dialing system, the re-dial number is defined as the last dial number which employed normal dialing. In the preferred embodiment, the re-dial number includes dial numbers which employed normal and memory dialing before the re-dial command code was read. Therefore, in the above key input sequence, the dial number which corresponds to the third key input (ND2) is re-dialed in the conventional telephone dialing device. In the present invention, the dial numbers which correspond to four key inputs, ND1+MD1+ND2+MD2, are to be re-dialed. Re-dialing of more than one dial number is possible because the addresses of the dial numbers to be re-dialed in the data memory unit (30) have been recorded in the program memory unit (20). The address code corresponding to a re-dial number is a phantom address which is used to identify the key input as a re-dial number. In the preferred embodiment, the phantom address 111 is allocated to the re-dial number.

When the keypad (40) is used to provide a dialing sequence, key inputs from the keypad (40) are transmitted via the ROW-COL signal path for reception by the input microcode encoder (14), the command encoder (1) and the address encoder (2). After the input microcode encoder (14) has detected that the first key input (ND1) involves a normal dialing activity, the input microcode encoder (14) sends control signals to the command encoder (1) and to the address encoder (2) via the WR-BUF signal path. The command encoder (1) responds by storing the normal command code 00 into the command register (5), while the address encoder (2) responds by storing the address code 000 into the address register (6). The address code 000 indicates that the corresponding normal dial number has been stored in the address 000 of the data memory unit (30).

The succeeding key input at the ROW-COL signal path is received by the input microcode encoder (14), the command encoder (1) and the address encoder (2). After the input microcode encoder (14) has detected that the second key input (MD1) involves memory dialing, the input microcode encoder (14) sends control signals to the command encoder (1) and to the address encoder (2) so as to control the command encoder (1) to store the memory command code 01 into the command register (5), and to control the address encoder (2) to store the address code 110 into the address register (6). The address code 110 indicates that the corresponding memory dial number was stored in the address 000 of the data memory unit (30). The above procedure is repeated for the third to sixth key inputs. The contents of the command register (5) and the address register (6) are similar to those of the program memory unit (20) shown in FIG. 2A after the above storing operations have been accomplished.

The command write counter (9) and the address write counter (10) are initially set to 0. Each time a command code is loaded into the command register (5), the respective count outputs of the write counters (9, 10) are incremented by one unit. In the above example, there are six command codes which are loaded into the command register (5), and therefore, the count outputs of the command write counter (9) and the address write counter (10) are both equal to 6 after the above loading operations have been accomplished. The command read counter (7) is similarly initially set to 0. The count output of the command read counter (7) is incremented by one unit each time a command code is read from the command register (5). When the count output of the command read counter (7) becomes equal to that of the command write counter (9), all of the previously loaded command codes have been read, thereby indicating that the dialing operation has been concluded.

From the foregoing, the count output of the command write counter (9) is 6, while the count output of the command read counter (7) is 0 immediately after all storing operations have been accomplished. The command count comparator (11) compares the count outputs of the command read counter (7) and the command write counter (9). If both outputs are unequal, the command count comparator (11) generates a control signal at the INSC-FLG signal path for reception by the output microcode encoder (15) so as to inform the latter that the dialing operation has not yet been concluded and that there are some dial commands which have yet to be executed. The output microcode encoder (15) then provides control signals to the command decoder (3), to the command register (5) and to the command read counter (7) via the RD-BUF signal path. The command read counter (7) is thus controlled so as to point to the location of the next command code in the command register (5) which is to be executed. The command register (5) sends a command code to the command decoder (3) via the INS-OP signal path. After the command decoder (3) has-decoded the command code from the command register (5), it can determine that the first key input (ND1) involves a normal dialing activity. The command decoder (3) then informs the output microcode encoder (15) that normal dialing is to be accomplished by sending an instruction signal via the INS-FLG signal path. The output microcode encoder (15) then sends control signals to the address decoder (4), to the address register (6) and to the address read counter (8) via the RD-BUF signal path. The address read counter (8) is therefore controlled so as to point to the location of the next address code which is to be read from the address register (6). The address register (6) sends an address code therefrom to the address decoder (4) via the ADR-OP signal path. The decoded address code from the address decoder (4) is then sent to the output microcode encoder (15) via the ADR-FLG signal path.

It has thus been shown that the output microcode encoder (15) knows two things at this stage: that a normal dialing activity is to be executed; and the location of the dial number which corresponds to the first key input (ND1) in the data memory region (30). The output microcode encoder (15) then sends control signals to the telephone control unit (50) via the $\mu$CODE-OP signal path. The telephone control unit (50) can thus retrieve the location of the dial number to be dialed, which location was stored in the address register (6). The telephone control unit (50) then operates the dial circuit (60) so as to execute the actual dialing operation, and sends a control signal to the output microcode encoder (15) via the SYS-CTL signal path when dialing of the dial number has been completed. The count output of the command read counter (7) is now incremented to one and is still unequal to the count output of the command write counter (9). The command count comparator (11) again generates a control signal at the INSC-FLG signal path for reception by the output microcode encoder (15) so as to inform the latter that the dialing operation has not yet been concluded and that there are still some dial commands which have yet to be executed. The above described procedure for the first key input (ND1) is repeated until the first four key inputs have been processed.

The following is a brief description of the re-dialing procedure of the preferred embodiment:

After the first four key inputs have been executed, the count output of the command read counter (7) is equal to 4 and is still unequal to the count output of the command write counter (9). The command count comparator (11) then generates a control signal at the INSC-FLG signal path for reception by the output microcode encoder (15) so as to inform the latter that the dialing operation has not yet been concluded and that there are still some dial commands which have yet to be executed. The output microcode encoder (15) then provides control signals to the command decoder (3), to the command register (5) and to the command read counter (7) via the RD-BUF signal path. The command read counter (7) is thus controlled so as to point to the location of the next command code in the command register (5) which is to be executed. The command register (5) sends the command code to the command decoder (3) via the INS-OP signal path.

After the command decoder (3) has decoded the command code corresponding to the fifth key input (RD1), it can determine that the fifth key input (RD1) involves a re-dialing activity. The command decoder (3) then informs the output microcode encoder (15) that re-dialing is to be accomplished by sending a control signal via the INS-FLG signal path.

Upon knowing that re-dialing is to be accomplished, the output microcode encoder (15) activates the address re-dial counter (12). The count output of the address re-dial counter (12) is sent to the address register (6) and to the address count comparator (13) via the QARE signal path. The count output of the address re-dial counter (12) is initially set to 0 and is used to indicate the location in the data memory unit (30) of the first dial number to be re-dialed, as stored in the address register (6). Since the count output of the address re-dial counter (12) is 0, the address re-dial counter (12) indicates that the dial number which corresponds to the first key input (ND1) is to be re-dialed. The address count comparator (13) then compares the count outputs of the address read counter (8) and the address re-dial counter (12). If the count outputs of the address read counter (8) and the address re-dial counter (12) are unequal, the address count comparator (13) sends a control signal to the output microcode encoder (15) via the ADRC-FLG signal path so as to inform the same that the re-dialing operation has yet to be concluded. The output microcode encoder (15) then sends control signals to the address decoder (4), to the address register (6) and to the address re-dial counter (12) via the RD-BUF signal path. The address register (6) sends an address code therefrom to the address decoder (4) via the ADR-OP signal path. The decoded address code from the address decoder (4) is then sent to the output microcode encoder (15) via the ADR-FLG signal path. The output microcode encoder (15) knows two things at this stage: that the first key input (ND1) involves a normal dialing activity; and the location of the dial number which corresponds to the first key input (ND1) in the data memory unit (30). The output microcode encoder (15) then sends control signals to the telephone control unit (50) via the $\mu$CODE-OP signal path. The telephone control unit (50) can thus retrieve the location of the dial number to be dialed, which location was stored in the address register (6). The telephone control unit (50) then operates the dial circuit (60) so as to execute the actual dialing operation, and then sends a control signal to the output microcode encoder (15) via the SYS-CTL signal path when actual dialing of the dial number has been completed. The address count comparator (13) again compares the count outputs of the address read counter (8) and the address re-dial counter (12). The count output of the address read counter (8) is equal to 5, while that of the address re-dial counter (12) is equal to 1 at this stage. The address count comparator (13) again generates a control signal at the ADRC-FLG signal path for reception by the output microcode encoder (15) so as to inform the latter that the re-dialing procedure has not yet ended and that there are still some dial numbers which have yet to be re-dialed. The above described procedure for the first key input (ND1) is repeated until the fourth key input (MD2) has been re-dialed.

After re-dialing of the fourth key input (MD2) has been accomplished, the count output of the address re-dial counter (12) becomes equal to 4. The address code 111 is then retrieved from the address register (6)

and is received by the address decoder (4). The address decoder (4), after decoding the address code 111, then informs the output microcode encoder (15) that the address 111 is a phantom address. The output microcode encoder (15) then increments the count output of the address re-dial counter (12) by one unit. The count output of the address re-dial counter (12) becomes equal to that of the address read counter (8), thereby indicating that the re-dial operation has been concluded. The address count comparator (13) then generates a control signal via the ADRC-FLG signal path so as to inform the output microcode encoder (15) that re-dialing has been completed. The output microcode encoder (15) then performs the required operations for dialing the sixth key input (MD3).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for dialing a telephone number, comprising the steps:

providing a data memory unit which includes a first memory region for storing normal dial numbers and a second memory region containing pre-stored memory dial numbers;

operating a keypad so as to provide a sequence of key inputs;

decoding said key inputs sequentially to determine if a decoded one of said key inputs involves a normal dialing activity or a memory dialing activity;

if the decoded one of said key inputs involves a normal dialing activity, storing a normal dial number corresponding to the decoded one of said key inputs in said first memory region of said data memory unit; and generating a first code which includes a normal dialing command code and a first address code to indicate the location of the normal dial number corresponding to the decoded one of said key inputs in said first memory region of said data memory unit;

if the decoded one of said key inputs involves a memory dialing activity, generating a second code which includes a memory dialing command code and a second address code to indicate the location of the memory dial number corresponding to the decoded one of said key inputs in said second memory region of said data memory unit;

storing said first and second codes in a program memory means in a sequence similar to that of said key inputs from said keypad;

retrieving said first and second codes sequentially from said program memory means; and retrieving the corresponding dial number from said data memory unit and executing the dialing activity corresponding to the retrieved one of said first and second codes.

2. A method for dialing a telephone number, comprising the steps:

providing a data memory unit which includes a first memory region for storing normal dial numbers and a second memory region containing pre-stored memory dial numbers;

operating a keypad so as to provide a sequence of key inputs;

decoding said key inputs sequentially to determine if a decoded one of said key inputs involves a normal dialing activity, a memory dialing activity or a re-dialing activity;

if the decoded one of said key inputs involves a normal dialing activity, storing a normal dial number corresponding to the decoded one of said key inputs in said first memory region of said data memory unit; and generating a first code which includes a normal dialing command code and a first address code to indicate the location of the normal dial number corresponding to the decoded one of said key inputs in said first memory region of said data memory unit;

if the decoded one of said key inputs involves a memory dialing activity, generating a second code which includes a memory dialing command code and a second address code to indicate the location of the memory dial number corresponding to the decoded one of said key inputs in said second memory region of said data memory unit;

if the decoded one of said key inputs involves a re-dialing activity, generating a third code which includes a re-dialing command code;

storing said first, second and third codes in a program memory means in a sequence similar to that of said key inputs from said keypad;

retrieving said first, second and third codes sequentially from said program memory means;

if the retrieved code is one of said first and second codes, retrieving the corresponding dial number from said data memory unit and executing the dialing activity corresponding to the retrieved code; and if the retrieved code is said third code, sequentially retrieving the corresponding dial numbers from said data memory unit and sequentially executing the dialing activities corresponding to said first and second codes which preceded said third code in said program memory means.

3. A telephone dialing device, comprising:

a data memory unit which includes a first memory region for storing normal dial numbers and a second memory region containing pre-stored memory dial numbers;

a keypad which is operable so as to provide a sequence of key inputs;

means for decoding said key inputs sequentially to determine if a decoded one of said key inputs involves a normal dialing activity or a memory dialing activity;

a first programmed means for storing a normal dial number corresponding to the decoded one of said key inputs in said first memory region of said data memory unit if the decoded one of said key inputs involves a normal dialing activity;

a second programmed means for generating a first code which includes a normal dialing command code and a first address code to indicate the location of the normal dial number corresponding to the decoded one of said key inputs in said first memory region of said data memory unit if the decoded one of said key inputs involves a normal dialing activity, said second programmed means generating a second code which includes a memory dialing command code and a second address code to indicate the location of the memory dial number corresponding to the decoded one of said key inputs in said second memory region of said data memory unit if the decoded one of said key inputs involves a memory dialing activity;

a program memory means for storing said first and second codes therein in a sequence similar to that of said key inputs from said keypad;

a third programmed means for retrieving said first and second codes sequentially from said program memory means; and a fourth programmed means for retrieving the corresponding dial number from said data memory unit and for executing the dialing activity corresponding to the retrieved one of said first and second codes.

4. A telephone dialing device, comprising:

a data memory unit which includes a first memory region for storing normal dial numbers and a second memory region containing pre-stored memory dial numbers;

a keypad which is operable so as to provide a sequence of key inputs;

means for decoding said key inputs sequentially to determine if a decoded one of said key inputs involves a normal dialing activity, a memory dialing activity or a re-dialing activity;

a first programmed means for storing a normal dial number corresponding to the decoded one of said key inputs in said first memory region of said data memory unit if the decoded one of said key inputs involves a normal dialing activity;

a second programmed means for generating a first code which includes a normal dialing command code and a first address code to indicate the location of the normal dial number corresponding to the decoded one of said key inputs in said first memory region of said data memory unit if the decoded one of said key inputs involves a normal dialing activity, said second programmed means generating a second code which includes a memory dialing command code and a second address code to indicate the location of the memory dial number corresponding to the decoded one of said key inputs in said second memory region of said data memory unit if the decoded one of said key inputs involves a memory dialing activity, said second programmed means generating a third code which includes a re-dialing command code if the decoded one of said key inputs involves a re-dialing activity;

a program memory means for storing said first, second and third codes therein in a sequence similar to that of said key inputs from said keypad;

a third programmed means for retrieving said first, second and third codes sequentially from said program memory means; and a fourth programmed means for retrieving the corresponding dial number from said data memory unit and for executing the dialing activity corresponding to the retrieved code if the retrieved code is one of said first and second codes, said fourth programmed means sequentially retrieving the corresponding dial numbers from said data memory unit and sequentially executing the dialing activities corresponding to said first and second codes which preceded said third code in said program memory means if the retrieved code is said third code.

* * * * *